B. B. GOLDSMITH.
ERASER.
APPLICATION FILED MAR. 8, 1912.
1,189,937.
Patented July 4, 1916.
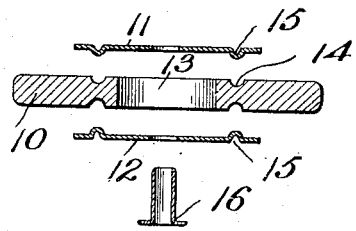
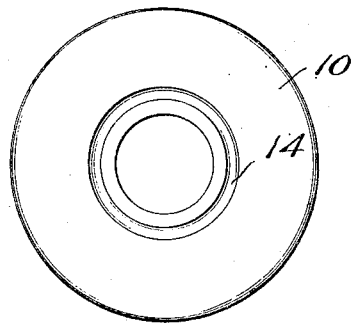
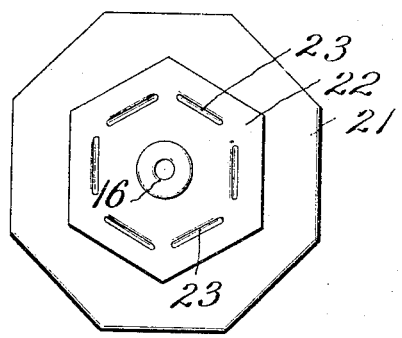
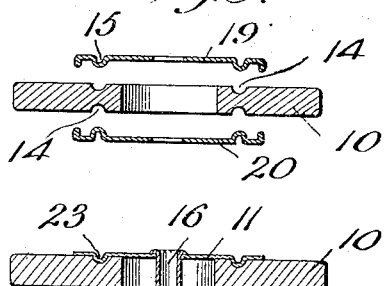
Byron B. Goldsmith
Inventor
By his Attorneys
Wilkinson, Gussta and MacKaye

UNITED STATES PATENT OFFICE.

BYRON B. GOLDSMITH, OF NEW YORK, N. Y.

ERASER.

1,189,937.  Specification of Letters Patent.  Patented July 4, 1916.

Application filed March 8, 1912. Serial No. 682,464.

*To all whom it may concern:*

Be it known that I, BYRON B. GOLDSMITH, a citizen of the United States, residing at the city of New York, in the county of New York and State of New York, have invented certain new and useful Improvements in Erasers; and I do hereby declare the following to be a full, clear, and exact description of the invention, such as will enable others skilled in the art to which it appertains to make and use the same.

It has been found that for many purposes it is convenient to use rubber erasers, either for ink or pencil, in circular form, and for this purpose disks of appropriate composition have been put upon the market. It has been customary hitherto to compress these disks between circular metal plates united through a central aperture and as these have hitherto been made, only a small part of the rubber has been available because, as soon as the rubber is worn down to the edge of the fastening disks, it is not possible to use the remainder.

It is the object of this invention to supply a form of eraser in which substantially the entire mass of the rubber disk is available for the purpose intended. With this end in view, I have contrived the form of eraser shown in two of its possible embodiments in the accompanying drawings, wherein—

Figure 1 shows in cross section the various parts of the eraser about to be assembled, Fig. 2 is a plan view of the rubber disk without the metal fastenings, Fig. 3 is a sectional view of a modified form showing the metal disks separated to form the eraser for the sake of clearness, Fig. 4 is a face view of another modified form, and Fig. 5 is a sectional view of still another modification within my invention.

An annular disk 10 is provided with two metal fastening disks 11 and 12 applied to the opposite sides of the central opening 13 and arranged to engage the inner edge of the annular rubber disk. In the form shown in Figs. 1 and 2 the rubber disk is supplied with a circular groove 14 preferably on each face as shown and the fastening disks, one or both, have corresponding circular corrugations 15 spun into them, which corrugations fit into the grooves 14, when the disks are applied to opposite sides, as indicated in Fig.

1. When the disks are applied they may be fastened in any desired manner and preferably by a rivet 16 which passes through the central openings shown in the disks 11 and 12, said rivet being turned over in a well known manner.

In Fig. 3 is shown a modification of my construction illustrating the fact that the use of pre-formed grooves in the eraser is not inconsistent with the use of sharp edges in the metal plates, intended to be pressed into the rubber composition. In this form the edges of the plates 19 and 20 are turned inward toward the eraser, so as to be pressed into the soft composition outside of the holding rims 15.

As illustrated in Fig. 4, my eraser may be given a contour other than circular, as may also the disks 22. This figure also illustrates the use of corrugations 23, of a non-continuous nature as substitutes for the corrugations 15 in the disks; it being understood that the grooves in the eraser body 21 are appropriately shaped to receive the same.

Fig. 4 illustrates the fact that it is not essential to my invention that the retaining corrugations be formed in both disks, but that one disk may be made flat.

What I claim is—

1. An eraser of appropriate yielding composition made in substantially annular form and having a central opening covered by metal disks applied to opposite sides of the eraser, one or both of said disks being supplied with means near its edges engaging the material of the eraser close to the edge of the central aperture of the annulus, substantially as described.

2. An eraser of appropriate yielding composition made in substantially annular form and having a central opening surrounded by depressions molded in the composition, and metal disks applied to opposite sides of the eraser, one or both of said disks having a bent in portion adapted to coöperate with the corresponding depression or depressions for engaging the material of the eraser and securing said disks, substantially as described.

BYRON B. GOLDSMITH.

Witnesses:
 FRANK DREWS,
 F. J. MRAZ.